United States Patent
Kashimura

Patent Number: 5,297,018
Date of Patent: Mar. 22, 1994

[54] RECORDING APPARATUS

[75] Inventor: Makoto Kashimura, Tokyo, Japan

[73] Assignee: Canon Kabushiki Kaisha, Tokyo, Japan

[21] Appl. No.: 683,837

[22] Filed: Apr. 11, 1991

[30] Foreign Application Priority Data

Apr. 11, 1990 [JP] Japan .................................. 2-95975

[51] Int. Cl.$^5$ ...................... B41J 2/01; B41J 11/48; B41J 29/02
[52] U.S. Cl. ................................ 346/134; 346/145; 400/605; 400/693
[58] Field of Search ............... 346/134, 136, 145; 248/167; 400/605, 625, 691–693; 271/9, 162; B41J 2/01, 11/48, 11/56, 11/58, 13/00, 13/12, 29/02, 29/13

[56] References Cited

U.S. PATENT DOCUMENTS

| | | | |
|---|---|---|---|
| 4,074,275 | 2/1978 | Stires, III | 346/19 |
| 4,313,124 | 1/1982 | Hara | 346/140 R |
| 4,314,733 | 2/1982 | Smith | 248/167 |
| 4,345,262 | 8/1982 | Shirato et al. | 346/140 R |
| 4,452,543 | 6/1984 | Adkisson et al. | 400/605 |
| 4,459,600 | 7/1984 | Sato et al. | 346/140 R |
| 4,463,359 | 7/1984 | Ayata et al. | 346/1.1 |
| 4,519,048 | 5/1985 | Abellana et al. | 364/900 |
| 4,531,852 | 7/1985 | Mädge et al. | 400/692 |
| 4,558,333 | 12/1985 | Sugitani et al. | 346/140 R |
| 4,569,608 | 2/1986 | Watanabe | 400/208 |
| 4,629,871 | 12/1986 | Scribner et al. | 235/375 |
| 4,723,129 | 2/1988 | Endo et al. | 346/1.1 |
| 4,740,796 | 4/1988 | Endo et al. | 346/1.1 |
| 4,828,416 | 5/1989 | Pensavecchia et al. | 400/624 |
| 4,847,640 | 7/1989 | Murakami | 346/145 |

FOREIGN PATENT DOCUMENTS

| | | | |
|---|---|---|---|
| 0137715 | 4/1985 | European Pat. Off. . | |
| 0418740 | 3/1991 | European Pat. Off. . | |
| 0418793 | 3/1991 | European Pat. Off. | 400/693 |
| 62-073972 | 4/1987 | Japan . | |
| 2196300 | 4/1988 | United Kingdom . | |

Primary Examiner—Benjamin R. Fuller
Assistant Examiner—Alrick Bobb
Attorney, Agent, or Firm—Fitzpatrick, Cella, Harper & Scinto

[57] ABSTRACT

A recording apparatus for recording onto a recording medium comprises a U-turn passage having a passage for guiding the recording medium from an upper to an under side, a straight-like passage for guiding the recording medium almost horizontally, a common passage connecting the U-turn passage and the straight-like passage, and a recording head for recording onto the recording medium provided along the common passage.

23 Claims, 4 Drawing Sheets

RECORDING APPARATUS

BACKGROUND OF THE INVENTION

1. Field of the Invention

The present invention relates to a recording apparatus for recording onto a recording sheet based on image information.

2. Related Background Art

A recording apparatus such as a printer, a copying machine or facsimile terminal equipment is constituted to record an image consisting of dot patterns onto a sheet-like recording medium (here after referred to as a recording sheet) such as paper or plastic thin board, by driving energy generation means of recording head, based on image information.

The recording apparatus can be classified into the ink jet printing, wire dot-matrix printing, thermal recording and laser beam printing systems, according to the method of recording.

As a recording sheet useful for recording, there is thick paper such as an envelope or postcard, or a special sheet such as a plastic thin board, as well as plain paper.

Here, the recording apparatus, which is generally a horizontal type, has an insertion opening and an exhaustion opening for a recording sheet which are provided on an upper face of the recording apparatus. A recording sheet inserted through the insertion opening is recorded while being conveyed along a recording sheet conveyance passage constructed as a U-shape, and then exhausted through the exhaustion opening after recording.

By the way, there arises a technical problem that when a thick recording sheet that does not easily bend such as a postcard or envelope is used in the horizontal type recording apparatus as above described, smooth conveyance was difficult as the sheet conveyance passage was formed as U-shape.

Thus, in order to convey the thick recording sheet such as a postcard or envelope smoothly, a recording apparatus has been proposed in which an insertion opening for thick paper or special sheet is provided on an under face of the apparatus to make its conveyance passage straight-like, whereby a recording sheet such as a thick paper can be also conveyed smoothly.

In this case, the insertion opening for the recording sheet is provided on upper and lower (bottom) faces, and the exhaustion opening for the recording sheet is provided on an upper face.

However, the recording apparatus having the insertion opening for recording sheets on upper and lower faces, as previously described, has two service positions (attitudes), i.e., horizontal and vertical, depending on the insertion direction of the recording sheet, and in order to be stable in either position an external shape of the recording apparatus must be almost cubical with the approximately same depth and height, resulting in a waste of space in the interior.

Moreover, with the recent rapid trend of miniaturized and low cost personal computers, the recording apparatus like a printer useful as an output apparatus is also demanded to be made small-sized and at lower cost.

SUMMARY OF THE INVENTION

An object of the present invention is to provide a recording apparatus which allows the external dimensions to be smaller.

Another object of the present invention is to provide a recording apparatus with a simple structure and lower cost.

Another object of the present invention is to provide a recording apparatus which can deal with a special recording sheet such as a thick paper and can make the excellent recording.

Another object of the present invention is, in view of the aforementioned technical problems, to provide a recording apparatus which can be used stably in either of the horizontal and vertical positions, and allows the miniaturization of external dimensions, simplification of structure, and reduction of cost.

Another object of the present invention is to provide a recording apparatus for recording onto a recording sheet based on image information, wherein the recording apparatus can be used stably in either of the horizontal and vertical positions, and allows the miniaturization of external dimensions, simplification of structure, and reduction of cost, by providing an insertion opening for recording sheet on both the same and opposite sides as an exhaustion opening for recording sheet and providing a rotatable support saddle on a back portion of the recording apparatus.

Another object of the present invention is to provide an ink jet recording apparatus using an ink jet recording head and having a battery mechanism, which can maintain the stable service condition, wherein it is constituted to have a rotatable support saddle on an external surface of recording apparatus on the hand of battery mechanism storage portion so as to place the center of gravity substantially and surely in a lower location in the vertical service condition.

Another object of the present invention is to provide an ink jet recording apparatus having an ink jet recording head and a battery mechanism, wherein it can perform the stable recording in either of the vertical and horizontal service conditions for the apparatus, by providing a support saddle on the hand of battery mechanism thereby to resolve misoperation problems resulting from the advantage of having no limitations in the service condition of ink jet recording head.

DETAILED DESCRIPTION OF PREFERRED EMBODIMENTS

The present invention will be specifically described with reference to the drawings.

Figure 1:
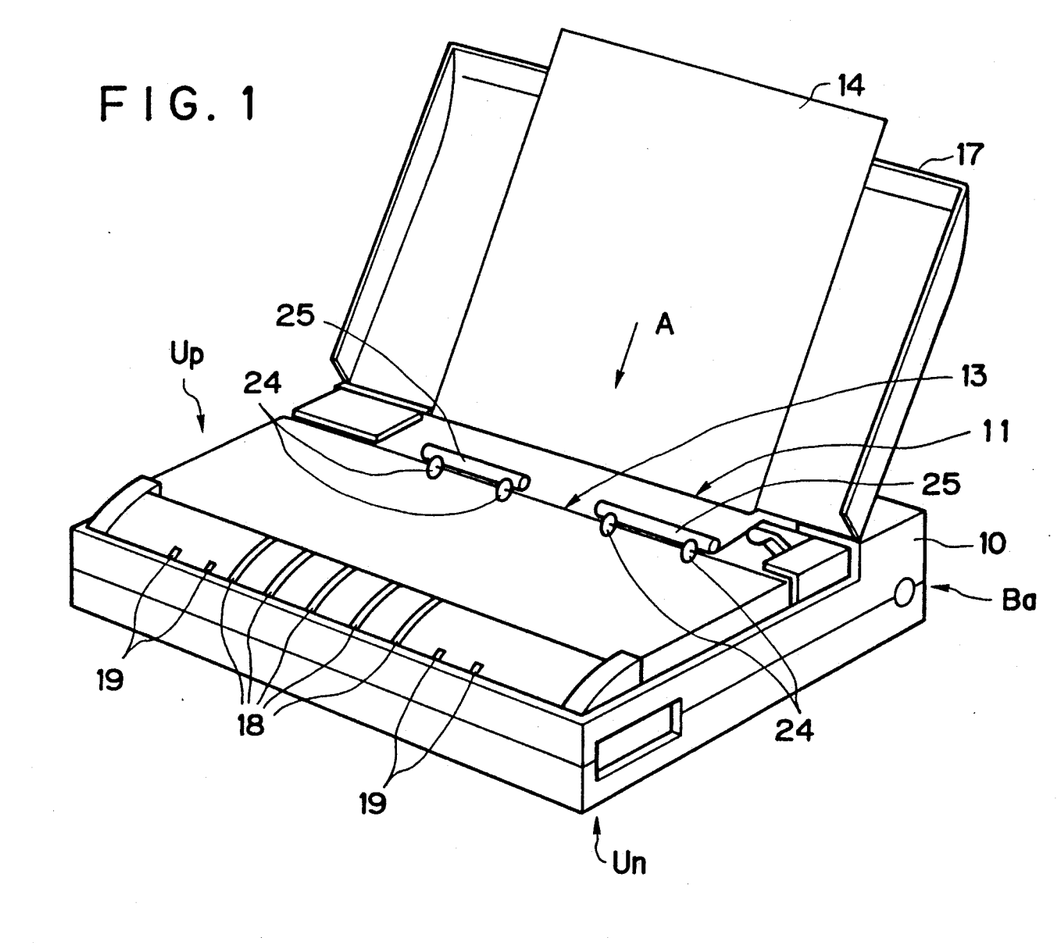
FIG. 1 is a perspective view showing one example of a recording apparatus to which the present invention is applied, in the horizontal service position.
Figure 2:
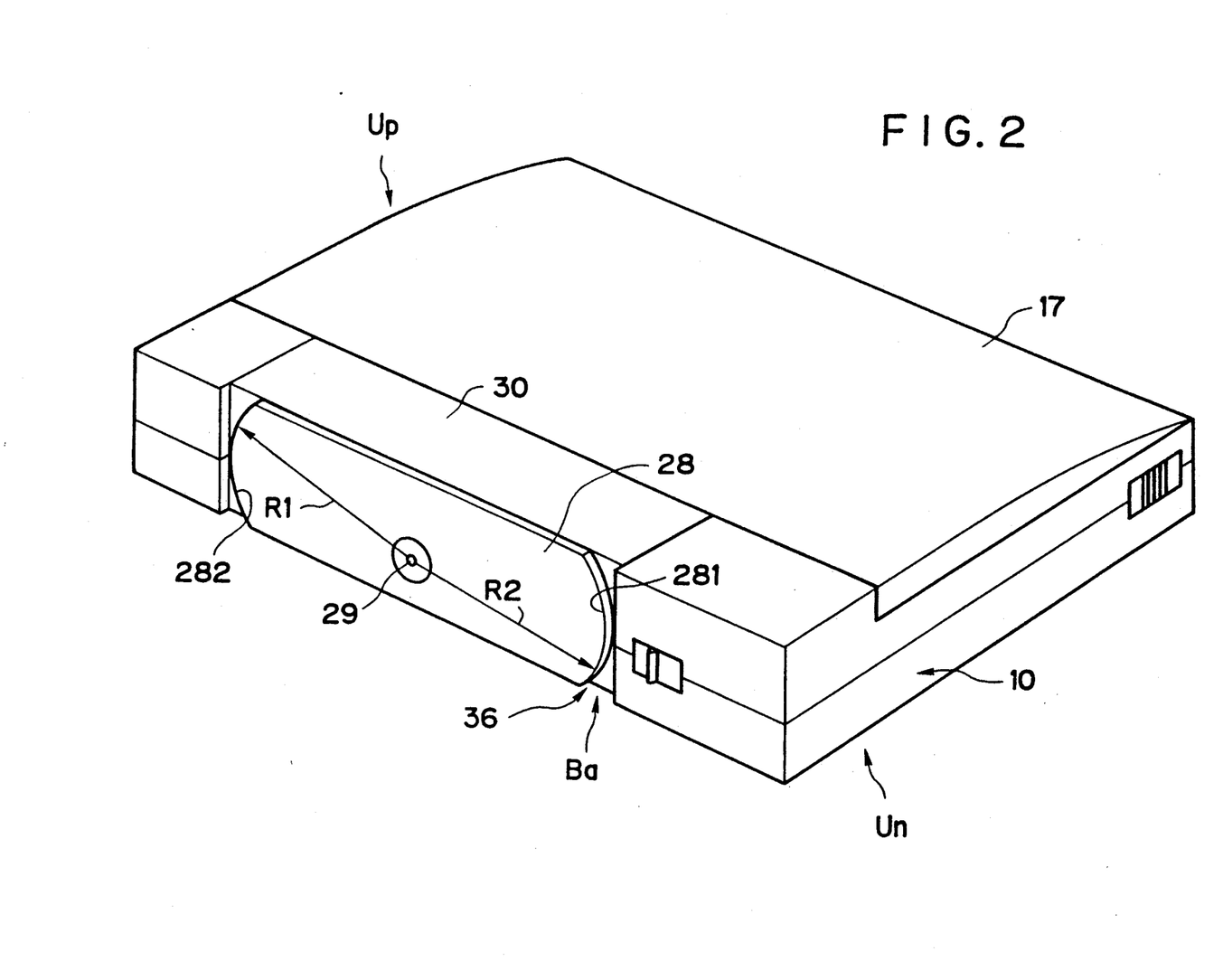
FIG. 2 is a perspective view showing a back portion of the recording apparatus as shown in FIG. 1, during the non-recording.
Figure 3:
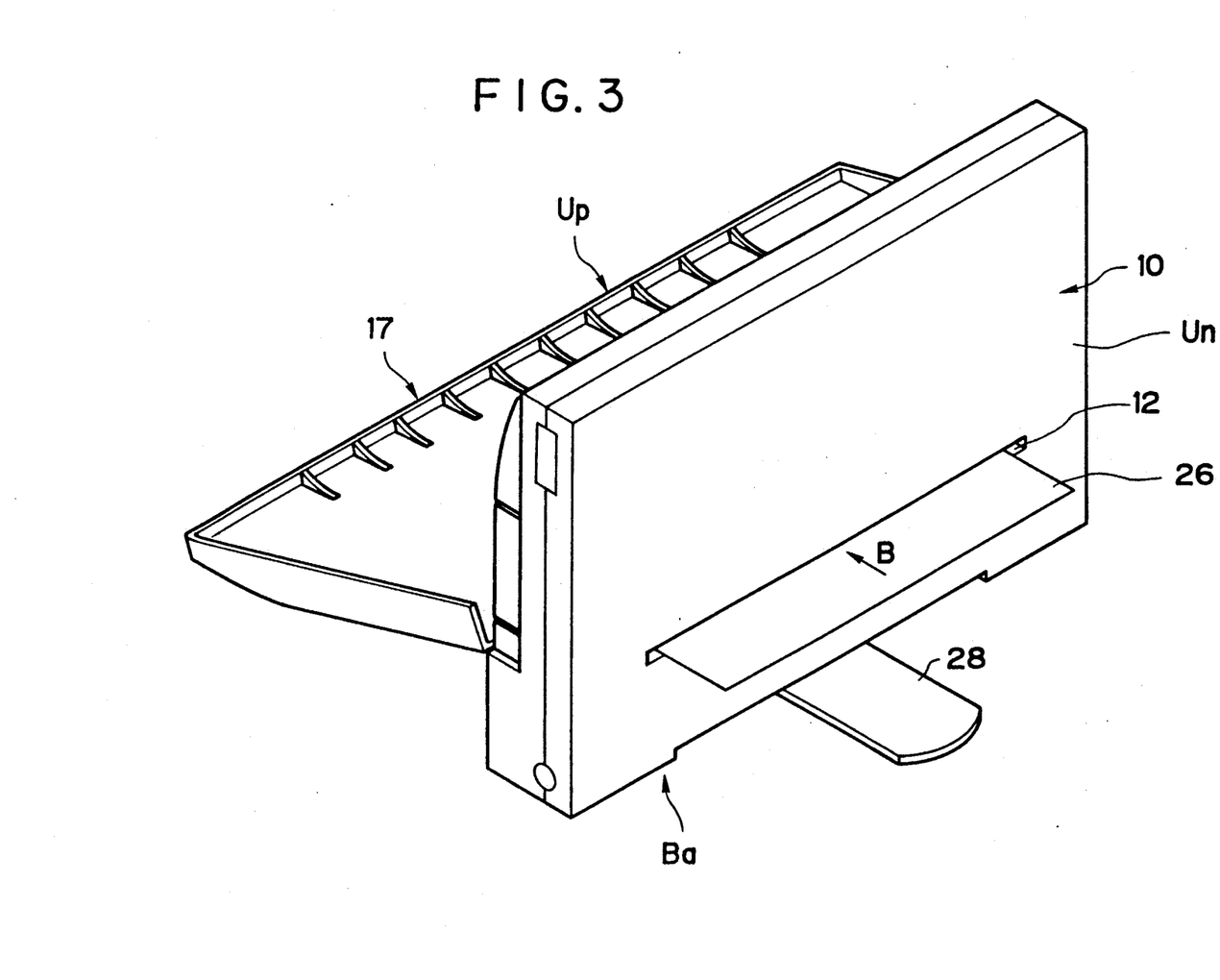
FIG. 3 is a perspective view showing the recording apparatus as shown in FIG. 1, in the vertical service position.
Figure 4:
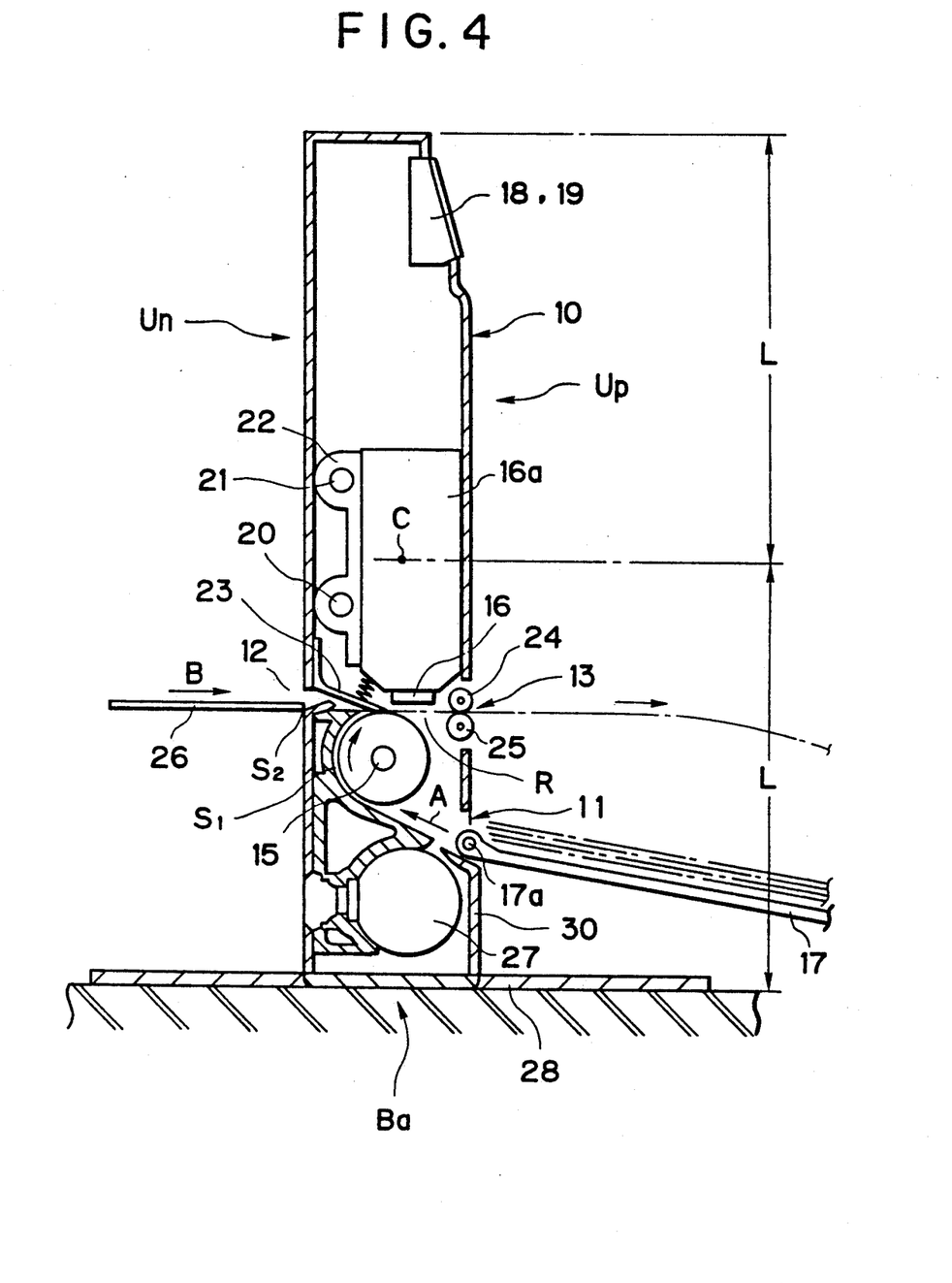
FIG. 4 is a longitudinal cross-sectional view showing the apparatus as shown in FIG. 3, in the vertical service position.

FIG. 1 is a perspective view showing a recording apparatus 10 according to one example of the present invention, in the horizontal service position, FIG. 2 is a perspective view showing a back portion of the recording apparatus 10 as shown in FIG. 1. Further, FIG. 3 is a perspective view showing the recording apparatus 10 as shown in FIG. 1, in the vertical service position. Still further, FIG. 4 is a longitudinal cross-sectional view showing an internal construction of the apparatus 10 as shown in FIG. 3, in the vertical service position.

In FIGS. 1-4, the recording apparatus 10 is an ink jet recording apparatus operable with the ink jet recording method for recording an image onto a recording sheet 14 by discharging the ink through discharge ports of a recording head by the use of electricity-heat or electrothermal converters for forming ink liquid droplets.

As clearly seen from the figures, it should be noted that the recording apparatus 10 of this example is normally used in the horizontal service position (as shown in FIG. 1), while in the vertical position, it is standing with a back portion Ba being placed on the underside and an upper face Up as the front face.

On the upper face Up of the recording apparatus 10, a first insertion opening 11 for recording sheet and an exhaustion opening 13 for recording sheet are provided. A recording sheet 14 inserted through the first insertion opening for recording sheet 11 is closely carried on a peripheral surface of platen roller 15 (FIG. 4) which is also used as sheet feed roller, and conveyed in the direction of the arrow A along a first recording sheet conveyance passage S1. That is, as shown in FIG. 4, the recording sheet manually inserted from an upper cover 17 through the sheet insertion opening 11 is conveyed by the platen roller 15 and exhausted through the sheet exhaustion opening 13. The above mentioned recording sheet 14 inserted through the sheet insertion opening 11 passes through a position opposed to recording head 16 (FIG. 4), where an image is recorded by the recording head 16, and is exhausted upward (forward in the vertical type) through the sheet exhaustion opening 13 after recording.

The upper cover 17 is fitted, in an openable or closable manner, into place on an upper face of the recording apparatus 10, wherein it is used as a paper feed tray or exhaustion tray in an open state during recording, as shown in FIG. 1, and is set to a closed position during non-recording (reverse or storage), as shown in FIG. 2.

The upper cover 17 has a feature of covering and protecting an upper face Up of recording apparatus 10 in the closed state, in which the first recording sheet insertion opening 11, the recording sheet exhaustion opening 13, switches 18, a display 19 and so on are disposed.

As shown in FIG. 4, the recording head 16 is mounted on a carriage 22 movable in a reciprocatory motion along guide shafts 20, 21 parallel to the platen roller 15.

Note that the recording head is shown in this instance as an ink jet recording head, in which an ink tank for storing the ink and the head are integrally formed as an exchangeable head cartridge for the recording apparatus 10. Also, the recording head 16 may be formed separately from the ink tank.

Further, the ink jet recording head 16 is a recording head for discharging the ink by the use of the heat energy with electricity-heat or electrothermal converters for generating the heat energy.

Also, the ink jet recording head 16 makes the recording by discharging the ink through the discharge ports by growth of bubbles owing to film boiling caused by the heat energy applied by the electricity-heat or electrothermal converters.

Further, a sheet presser plate 23 for pressing a recording sheet 14 against the platen roller 15 is placed upstream of the recording head 16 in the conveyance direction, and elastically biased onto a periphery of platen roller 15 by means of a spring 35 provided between main body of apparatus and the presser plate 23.

Further, a spur 24 having teeth around its periphery and an exhaustion roller 25 to aid in the exhaustion of recording sheet 14 are disposed in the recording sheet exhaustion opening 13.

Next, the vertical service position of the recording apparatus 10 will be described with reference to FIGS. 3 and 4.

On the rear face Un (back face in the vertical condition) of the recording apparatus 10, a second recording sheet insertion opening 12 is provided. And a second recording sheet conveyance passage S2 is formed in a substantially straight shape, leading from the recording sheet insertion opening 12 through a recording portion R between the recording head 16 and the platen roller 15 to the recording sheet exhaustion opening 13.

This second recording sheet conveyance passage S2 can easily feed a thick recording sheet 26, such as a postcard or envelope, or a special recording sheet such as a plastic sheet, because of its substantially straight shape.

For example, the recording sheet or special recording sheet 26 is inserted in the direction of the arrow B as indicated in FIG. 3, passed through the recording portion R, exhausted out of the recording sheet exhaustion opening 13, and stacked onto a paper exhaustion tray formed by the upper cover 17 placed in the open state around an axis 17a.

A support saddle 28 is mounted to be rotatable (for storage and overhang) on a back portion Ba (or an under face Un in the vertical position shown in FIGS. 3 and 4) of the recording apparatus 10. In the example as shown, the support saddle 28 is rotatably mounted around an axis 29 within a recess 36 depressed by almost a thickness of support saddle 28 which is provided on the back portion Ba.

When the recording apparatus 10 is used in the vertical position, the support saddle 28 is rotated to the overhang position where it is approximately orthogonal to the body of recording apparatus 10. Thereby, the recording apparatus 10 can be stably supported in the vertical position, and can be placed in a stable condition for inserting the recording sheet 14, or operating the switches 18.

On the other hand, when the recording apparatus 10 is used in the horizontal position, or put into storage, the support saddle 28 is rotated into a withdrawal position almost parallel to the recording apparatus 10, as shown in FIG. 2, so that the support saddle 28 can be set to the state where it is no obstacle to the recording apparatus 10 in the horizontal position, thereby not impeding the storage or transport.

In this example, particularly the support saddle 28 provided on the back portion Ba of recording apparatus 10 serves as a backup for a battery cover 30 for carrying a battery 27 contained in the back portion Ba of the apparatus, so that the battery cover 30 detachable from the main body can not be easily disengaged owing to the vibration or impact.

It should be noted that when using an ink jet recording head 16, the battery 27 serves as a driving source for the heat driving of the ink jet recording head 16 or the serial reciprocation driving in recording, or recovery means for performing well-known head recovery processsing such as suction or pressure recovery, cleaning, etc., in accordance with the timer for determining the non-use period or determining that the apparatus is unused for a long time or intermittently used. The battery 27 may be a battery mechanism such as an accumulator or solar battery as well as a conventional battery.

As previously described, this example is a recording apparatus using the ink jet recording head 16 and the battery mechanism 27, wherein in the horizontal service position, the battery mechanism 27 is arranged to place its large surface (back portion Un) of almost rectangular parallelopiped on the bottom face, as seen from FIG. 2, so that the apparatus can be used stably without substantially changing the center of gravity. In the vertical service position, by means of the support saddle 28 provided in the vicinity of the battery mechanism as seen from FIG. 4, an operator can use the apparatus with the support saddle 28 placed on the bottom without false operation, whereby the recording is performed with the center of gravity being necessarily placed in a lower part of the apparatus 10. In this case, the support saddle 28 serves to put the apparatus into an extremely stable state due to the cooperation with the battery mechanism 27.

Note that the end portions 281, 282 of support saddle 28 in the longitudinal direction are shaped like circular arcs, as shown in FIG. 2. This contour is intended to distribute evenly the external load applied thereto and absorb the load over the entire surface of support saddle 28. This circular arc shape is one in which the end portion 282 is a circular arc with the radius R1, and the end portion 281 with the radius R2, with the center of rotation in the support saddle 28. The support saddle 28 has preferably the same lengths from the center of rotation 29 to the end portions 281, 282 (i.e., R1=R2), but may have different lengths, depending on the balance of the apparatus 10.

With different lengths, the rotational direction of support saddle 28 is limited within a range of 180°, thereby its service positions being restrained.

It should be noted that the rotatable support saddle 28 is preferably made of the same material as that of the main body of apparatus, and it is more preferred that in the vertical service position, the support saddle is held in position orthogonal to the apparatus body on the central portion thereof, while in the horizontal service position, it is held in a position such that it is substantially accommodated within an external face of the apparatus body. A well-known stop mechanism is used in which a combination of a rib for stopping the rotation and a rib which is ridden over by the support saddle but serves as a stop with a slight amount of working force or a hook mechanism is applicable.

In FIG. 4, above the support saddle 28 forming the under face, there is shown the battery mechanism 27, above which are located a conveyance mechanism such as platen roller 15, and further the ink jet recording head 16 in a downwardly directed recording form (for discharging the ink downwardly), with the center C of the apparatus body 10 with height 2L being located at the ink tank 16a for recording head 16. Thereby, according to this example, when the ink jet recording head 16 is formed as a disposable or replaceable type, the amount of ink storage within the ink tank 16a is decreased during the consumption for recording, while most of the weight of whole apparatus is located lower than the center C, so that the vertical service position can be made more stable.

As described, according to this example, the recording sheet insertion openings 11, 12 are provided on an upper face Up and an under face Un of recording apparatus 10, and the recording sheet exhaustion opening 13 is provided on the upper face Up of recording apparatus 10. Also, the recording sheet insertion openings 11, 12 are provided on the identical and opposite faces to the recording sheet exhaustion opening 13, respectively, and the rotatable support saddle 28 is provided on a back portion of the recording apparatus 10. Thus, the recording apparatus 10 can be operated stably even when used in the vertical position, with an extremely simple, compact and inexpensive construction. When the apparatus is used in the stable horizontal position, the support saddle 28 is not an obstacle projecting out or the apparatus body because it can be contained within the recess 36, whereby the apparatus which can be placed in a very compact and convenient state for receiving, storing or transporting the apparatus 10.

In the previous example, the support saddle 28 is constituted to be rotatably carried about the axis 29 of the apparatus 10, whereas it can be constituted such that a portion corresponding to the axis 29 is formed integrally with the support saddle 28, using a plastic, and is rotatably fitted forcedly into the apparatus 10 with the elasticity of the plastic. With such a constitution, a further reduction of cost can be achieved.

Also, in the previous example, one support saddle 28 is mounted, but two or more identical support saddles can be mounted. Thus, by providing more than one support saddle, the length of support saddle can be shortened, and the space used by the apparatus 10 in the vertical position can be further reduced, so that the space efficiency in the use of apparatus is improved, and the stability of the apparatus 10 can be increased.

While in the above example, the present invention is applied to an ink jet recording apparatus, it should be understood that the present invention is similarly applicable to other types of recording apparatus such as those using the wire-dot printing or thermal imprint recording methods and can thereby accomplish the same effects.

Also, while in the above example, the present invention is applied to a serial scanning type recording apparatus using a recording head in a so-called serial scan method where the recording head 16 is mounted on carriage 22, it should be understood that the present invention is also applicable to a recording apparatus useable with other recording methods, such as a line type recording apparatus using a line type recording head which spans the entire recording area in the direction of paper width for a recording medium, and can accomplish the same action effects.

The present invention is similarly applicable to a recording apparatus using a plurality of recording heads such as a color recording apparatus, irrespective of the number of recording heads, and can accomplish the same effects.

Next, the ink jet recording apparatus will be described in more detail in which the recording is performed by discharging the ink through the discharge ports by the use of the heat energy of electricity-heat or electrothermal converters as the energy for recording.

As to its representative constitution and principle, for example, one practiced by use of the basic principles disclosed in, for example, U.S. Pat. Nos. 4,723,129 and 4,740,796 is preferred.

This system is applicable to either of the so-called on-demand type and the continuous type. Particularly, the case of the on-demand type is effective because, by applying at least one driving signal which gives rapid temperature elevation exceeding nucleate boiling in recording liquid corresponding to the recording information on electricity-heat converters arranged corresponding to the sheets or liquid channels holding a recording liquid (ink), heat energy is generated at the electricity-heat or electrothermal converters to effect film boiling in the recording liquid near the heat acting surface of the recording head, and consequently the bubbles within the recording liquid can be formed corresponding to the driving signals.

By discharging the recording liquid through an opening for discharging to the atmosphere by the action force arising in the growth and shrinkage process of the bubble, at least one droplet is formed.

By making the driving signals into pulse shapes, growth and shrinkage of the bubble can be effected instantly and adequately to accomplish more preferably discharging of the recording liquid particularly excellent in response characteristic. As the driving signals of such pulse shape, those as disclosed in U.S. Pat. Nos. 4,463,359 and 4,345,262 are suitable.

Further excellent recording can be performed by employment of the conditions described in U.S. Pat. No. 4,313,124 of the invention concerning the temperature elevation rate of the above-mentioned heat acting surface.

As the constitution of the recording head, in addition to the combination of the discharging orifice, liquid channel, and electricity-heat or electrothermal converter (linear liquid channel or right-angled liquid channel) as disclosed in the above-mentioned respective specifications, the constitution by use of U.S. Pat. Nos. 4,558,333, or 4,459,600 disclosing the constitution having the heat acting portion arranged in the flexed region is also included in the present invention.

Further, as the recording head of the full line type having a length corresponding to the maximum width of a recording medium which can be recorded by the recording device, either the constitution which satisfies its length by a combination of a plurality of recording heads as disclosed in the above-mentioned specifications or the constitution as one recording head integrally formed may be used, and in either case, the present invention can exhibit the effects as described above further effectively.

In addition, the present invention is effective for a recording head of the freely exchangeable chip type which enables electrical connection to the main device or supply of ink from the main device by being mounted on the main device, or a recording head of the cartridge type having an ink supply tank integrally provided on the recording head itself, as described in connection with the previous example.

Also, addition of a restoration means for the recording head, a preliminary auxiliary means, etc. provided as the constitution of the recording device of the present invention is preferable, because the effect of the present invention can be further stabilized.

Specific examples of these may include for the recording head, capping means, cleaning means, pressurization or suction means, electricity-heat converters or another type of heating elements, or preliminary heating means according to a combination of these, and it is also effective for performing stable recording to perform a preliminary mode which performs predischarging separate from recording.

Further, as the recording mode of the recording device, the present invention is extremely effective for not only the recording mode only of a primary color such as black etc., but also a device equipped with at least one of plural different colors or full color by color mixing, whether the recording head may be either integrally constituted or combined in plural number.

Still further, though the ink is considered as the liquid in the example of the present invention as above described, other ink may be also sufficient if it liquefies or softens by a recording signal issued thereto, even when it stiffens below the room temperature.

The most effective method for the ink as above described in the present invention is one based on the film boiling as above indicated.

As clearly seen from the above description, according to the present invention, a recording apparatus capable of performing an excellent recording in either of the vertical or horizontal position can be obtained.

What is claimed is:

1. A recording apparatus for recording on a recording medium, said apparatus comprising:
    a first conveyance route having an insertion port and an exhausting port for the recording medium, said insertion port and exhausting port being provided on a same surface of a body of said apparatus so as to convey the recording medium in a U-shaped path;
    a second conveyance route having an exhausting port common to said exhausting port of said first conveyance route and an insertion port provided at an opposite side to said exhausting port of said second conveyance route, said second conveyance route conveying the recording medium substantially linearly;
    a mounting means for mounting a recording member for recording on the recording medium, said mounting means and said recording member being provided at a common route common to said first and second conveyance routes;
    a platen roller for conveying recording medium, said platen roller being provided along said first and second conveyance routes; and
    a cover member openably provided at said insertion port of said first conveyance route, said cover member being capable of mounting the recording medium thereon when said cover member is open and protecting said exhausting port and said insertion port of said first conveyance route when said cover member is closed.

2. An apparatus according to claim 1, wherein said first conveyance route conveys said recording medium in a U-shaped path along a periphery of said platen roller.

3. An apparatus according to claim 1, wherein a press member for pressing said recording medium is provided to be elastically pressed to a periphery of said platen roller upstream of said recording member in a conveyance direction of the recording medium.

4. An apparatus according to claim 1, wherein a side of said recording apparatus is provided with a leg member for supporting said apparatus body when said recording apparatus is placed in an upright position.

5. An apparatus according to claim 1, wherein a battery mechanism is positioned below said platen roller when said apparatus is placed in an upright position.

6. An apparatus according to claim 1, wherein said recording member comprises a serially movable ink jet recording head.

7. An apparatus according to claim 1, wherein said recording member comprises a recording head for recording by utilizing thermal energy, said head including an electrothermal converting member for generating thermal energy.

8. An apparatus according to claim 7, wherein said recording head comprises an ink jet recording head for recording by discharging ink from a discharge port thereof by utilizing growth of a bubble generated by the thermal energy.

9. A recording apparatus for recording on a recording medium, said apparatus comprising:
- a first conveyance route having an insertion port and an exhausting port for the recording medium, said insertion port and exhausting port being provided on a same surface of a body of said apparatus so as to convey the recording medium in a U-shaped path;
- a second conveyance route having an exhausting port common to said exhausting port of said first conveyance route and an insertion port provided at an opposite side to said exhausting port of said second conveyance route, said second conveyance route conveying the recording medium substantially linearly;
- a recording member for recording on the recording medium, said recording member being provided at a common route common to said first and second conveyance routes;
- a platen roller for conveying the recording medium, said platen roller being provided along said first and second conveyance routes;
- a cover member openably provided at said insertion port of said first conveyance route, said cover member being capable of mounting the recording medium thereon when said cover member is open and protecting said exhausting port and said insertion port of said first conveyance route when said cover member is closed, wherein said recording member comprises an ink jet recording head having an ink tank for recording by discharging ink from a discharging port thereof by utilizing growth of a bubble generated by thermal energy, said head including an electrothermal converting member for generating thermal energy, and when said recording apparatus is placed in an upright position, the ink tank for said ink jet recording head is centered at a position one-half a height of said apparatus, the discharge port of said head is positioned below said ink tank, said platen roller is positioned below said discharge port and a battery mechanism is positioned below said platen roller.

10. An ink jet recording apparatus capable of recording on a recording medium when said apparatus is placed in an upright or horizontal position, said apparatus comprising:
- a first conveyance route having an insertion port and an exhausting port for the recording medium, said insertion port and exhausting port being provided on a same surface of a body of said apparatus so as to convey the recording medium in a U-shaped path;
- a second conveyance route having an exhausting port common to said exhausting port of said first conveyance route and an insertion port provided at an opposite side to said exhausting port of said second conveyance route, said second conveyance route conveying the recording medium substantially linearly;
- a mounting means for mounting an ink jet recording had member for recording on said recording medium by discharging ink, said mounting means and said recording head being provided at a common route provided common to said first and second conveyance routes;
- a platen roller for conveying the recording medium, said platen roller being provided along said first and second conveyance routes;
- a cover member openably provided at said insertion port of said first conveyance route, said cover member being capable of mounting the recording medium thereon when said cover member is open and protecting said exhausting port and said insertion port of said first conveyance route when said cover member is closed;
- an ink tank for storing ink to be supplied to said recording head, said ink tank being centered at a position one-half a height of said apparatus when said recording apparatus is placed in an upright position, a discharge port of said head being positioned below said ink tank, said platen roller being positioned below said discharge port and a battery mechanism being positioned below said platen roller; and
- a leg member provided on a side of said recording apparatus, said leg member supporting said apparatus body when said recording apparatus is placed in the upright position.

11. An apparatus according to claim 10, wherein said first conveyance route conveys the recording medium in a U-shaped path along a periphery of said platen roller.

12. An apparatus according to claim 10, wherein a press member for pressing the recording medium is provided to elastically press a periphery of said platen roller upstream of said recording head member in a conveyance direction of the recording medium.

13. An apparatus according to claim 10, wherein said recording head member records by utilizing thermal energy, said head member having an electrothermal converting member for generating thermal energy.

14. An apparatus according to claim 13, wherein said ink jet recording head member has a plurality of ink discharge portions each for discharging different inks.

15. A recording apparatus for recording on a recording medium, said apparatus comprising:
- a first conveyance route having an insertion port and an exhausting port for the recording medium, said insertion port and exhausting port being provided on a same surface of a body of said apparatus so as to convey the recording medium in a U-shaped path;
- a second conveyance route having an exhausting port common to said exhausting port of said first conveyance route and an insertion port provided at an opposite side to said exhausting port of said second conveyance route, said second conveyance route conveying the recording medium substantially linearly;
- a mounting means for mounting for attaching a recording member for recording on the recording medium, said mounting means and said recording member being provided at a common route common to said first and second conveyance routes;

a platen roller for conveying the recording medium, said platen roller being provided along said first and second conveyance routes;

a cover member openably provided at said insertion port of said first conveyance route, said cover member being capable of mounting the recording medium thereon when said cover member is open and protecting said exhausting port and said insertion port of said first conveyance route when said cover member is closed; and a leg member provided at a side of said recording apparatus for supporting the apparatus body when the recording apparatus is placed in an upright position.

16. An apparatus according to claim 15, wherein said leg member is rotatably provided on the side of the recording apparatus.

17. An apparatus according to claim 15, wherein said first conveyance route conveys said recording medium in a U-shaped path along a periphery of said platen roller.

18. An apparatus according to claim 15, wherein a press member for pressing said recording medium is provided to be elastically pressed to a periphery of said platen roller upstream of said recording member in a conveyance direction of the recording medium.

19. An apparatus according to claim 15, wherein a battery mechanism is positioned below said platen roller when said apparatus is placed in the upright position.

20. An apparatus according to claim 15, wherein said recording member comprises a serially movable ink jet recording head.

21. An apparatus according to claim 15, wherein said recording member comprises a recording head for recording by utilizing thermal energy, said head including an electrothermal converting member for generating thermal energy.

22. An apparatus according to claim 21, wherein said recording head comprises an ink jet recording head for recording by discharging ink from a discharge port thereof by utilizing growth of a bubble generated by the thermal energy.

23. An apparatus according to claim 22, wherein when said recording apparatus is placed in the upright position, an ink tank for said ink jet recording head is centered at a position one-half a height of said apparatus, the discharge port of said head is positioned below said ink tank, said platen roller is positioned below said discharge port and a battery mechanism is positioned below said platen roller.

* * * * *

UNITED STATES PATENT AND TRADEMARK OFFICE
CERTIFICATE OF CORRECTION

PATENT NO. : 5,297,018
DATED : March 22, 1994
INVENTOR(S) : Makoto KASHIMURA

It is certified that error appears in the above-indentified patent and that said Letters Patent is hereby corrected as shown below:

COLUMN 1:

Line 13, "(here after" should read --(hereafter--.

COLUMN 6:

Line 14, "or" should read --of--;
    Line 37, "apparatus" should read --apparatuses--.

COLUMN 7:

Line 4, "electricity-heat" should read --electricity-heat or electrothermal--;
    Line 60, "include" should read --include,--.

Signed and Sealed this

Twenty-seventh Day of September, 1994

Attest:

BRUCE LEHMAN

Attesting Officer     Commissioner of Patents and Trademarks